United States Patent [19]
Krinhop

[11] Patent Number: 6,152,536
[45] Date of Patent: Nov. 28, 2000

[54] BALE MOVER HAVING SIMULTANEOUSLY UNLOADING SIDE CRADLES

[76] Inventor: Robert E. Krinhop, 3334 Camp Rd., Manchester, Kans. 67410

[21] Appl. No.: 09/393,260

[22] Filed: Sep. 10, 1999

[51] Int. Cl.$^7$ .............................. A01D 90/10; B60P 1/16
[52] U.S. Cl. ............................................ 298/18; 414/470
[58] Field of Search ............................. 298/18; 414/24.5, 414/470

[56] References Cited

U.S. PATENT DOCUMENTS

| | | | |
|---|---|---|---|
| 4,500,242 | 2/1985 | Beikman | 298/18 X |
| 5,076,752 | 12/1991 | Rader | 298/18 X |

OTHER PUBLICATIONS

Cliff's Welding Service, Inc. brochure entitled "Pride of the Prairie Hay Trailers" and disclosing prior art bale movers (publication date unknown).

*Primary Examiner*—Janice L. Krizek
*Attorney, Agent, or Firm*—Hovey, Williams, Timmons & Collins

[57] ABSTRACT

A round bale moving trailer is disclosed as including a mobile frame and a pair of bale support cradles carried by the frame. The cradles have the same bale support capacities and are consequently capable of supporting an equal number of similarly dimensioned bales. Each of the cradles is supported on the frame for swinging movement between a bale-carrying position and a bale-unloading position. A control mechanism is provided for synchronizing swinging movement of the cradles. The illustrated control mechanism includes a single hydraulic piston and cylinder assembly coupled between the cradles in such a manner that extension and retraction of the assembly causes equal and simultaneous shifting of the cradles. The assembly is connected to a diamond-shaped linkage assembly which limits the ends of the assembly to equal shifting in relatively opposite directions.

20 Claims, 8 Drawing Sheets

BALE MOVER HAVING SIMULTANEOUSLY UNLOADING SIDE CRADLES

BACKGROUND OF THE INVENTION

1. Field of the Invention

The present invention relates generally to bale movers, such as large round bale moving trailers. More particularly, the present invention concerns a bale mover having a pair of shiftable bale support cradles that are configured to support an equal number of similarly dimensioned bales and are limited to synchronized movement between the bale-carrying and bale-unloading positions.

2. Discussion of Prior Art

A common problem often associated with crop baling is movement of the bales from one location to another (e.g., from the field to a storage or feeding location). Those ordinarily skilled in the art will appreciate that relocation of large bales, such as one ton round or rectangular bales, is particularly problematic. Furthermore, various bale movers have been developed, some of which are configured to support and move only one bale at a time while others are capable of moving a plurality of bales. With particular respect to multiple bale movers, it is desirable in some instances to configure the mover to support as many bales as possible. However, safety, cost and durability concerns have severely limited the capacity of conventional multiple bale movers. Although large capacity bale movers have been designed, these devices often have complex and expensive constructions that are not sufficiently durable in normal operating conditions.

OBJECTS AND SUMMARY OF THE INVENTION

Responsive to these and other problems, an important object of the present invention is to provide an improved multiple bale mover that overcomes the problems associated with conventional movers. It is also an important object of the present invention to provide a bale mover that is has a safe, durable and inexpensive construction. Another important object of the present invention is to provide a bale mover design that is capable of supporting and moving virtually any number of bales. Particularly, an important object of the present invention is to provide a bale mover having a pair of bale support cradles that simultaneously unload the bales. Yet another important object of the present invention is to provide such a bale mover wherein all movement of the cradles is synchronized.

In accordance with these and other objects evident from the following description of the preferred embodiment, the present invention concerns a bale mover including a frame and a pair of bale supporting cradles. The bale support cradles are configured to support the same number of similarly dimensioned bales, which consequently promotes equal loading of the cradles. Each cradle is supported on the frame for shifting movement between a bale-carrying position, in which the cradle is oriented to support the bale(s), and a bale-unloading position, in which the cradle is oriented to unload the bale(s). The mover further includes a control mechanism operably coupled to the cradles and configured to substantially synchronize shifting of the cradles as each cradle shifts from the bale-carrying position to the bale-unloading position.

The bale mover is preferably in the form of a trailer having ground wheels and a hitch for connection to a towing vehicle. Moreover, the preferred control mechanism includes a unique diamond-shaped linkage assembly that limits the cradles to equal and simultaneous movement.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
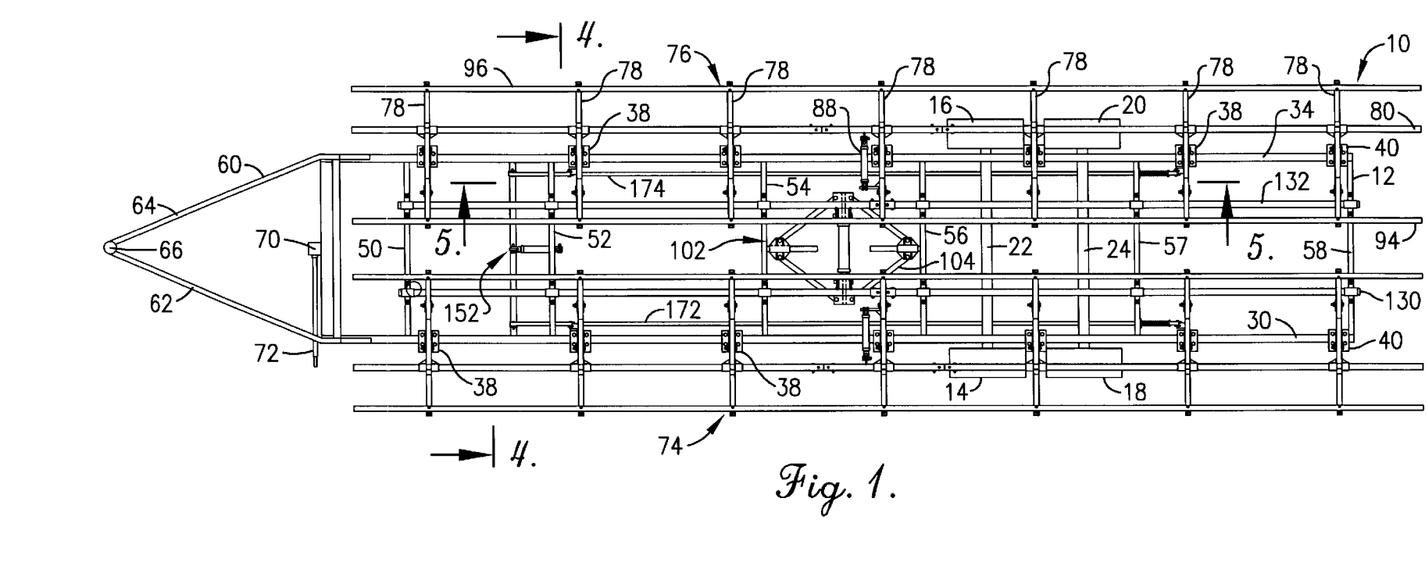
FIG. 1 is a plan view of a bale moving trailer constructed in accordance with principles of the present invention, particularly illustrating the bale support cradles in their respective bale-carrying positions.
Figure 2:
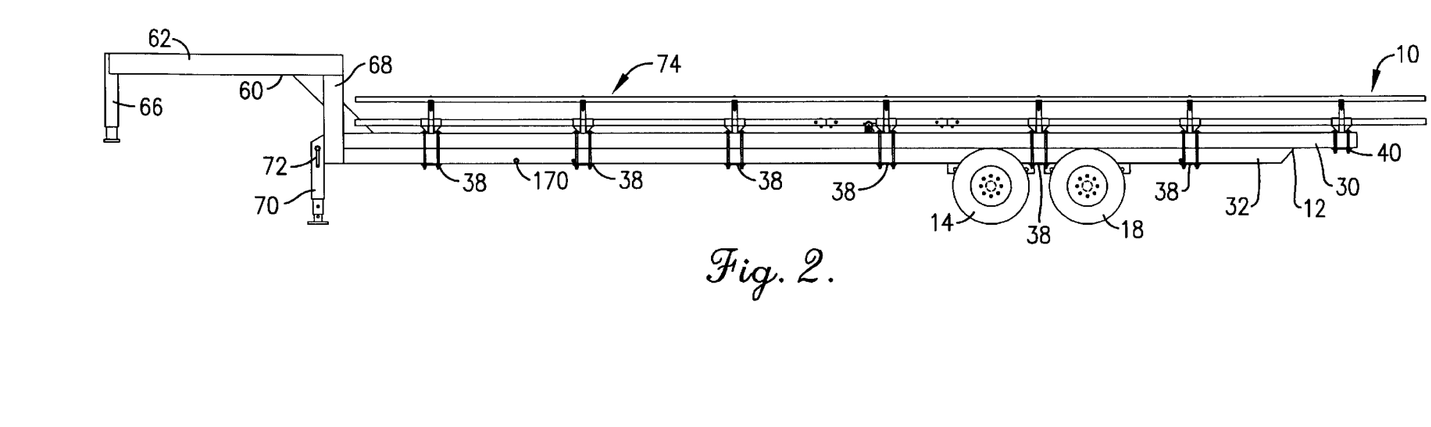
FIG. 2 is a side elevational view of the trailer.

Turning initially to FIGS. 1 and 2, the bale mover 10 selected for illustration is in the form of a trailer that is configured for connection to a towing vehicle (not shown) so as to be pulled across the ground. It will be appreciated, however, that the principles of the present invention are equally applicable to various other bale mover constructions. For example, the principles of the present invention may be incorporated in a self-propelled vehicle. It is also entirely within the ambit of the present invention to arrange the mover for retrofit attachment to a mobile chassis (e.g., a flatbed trailer).

Figure 3:
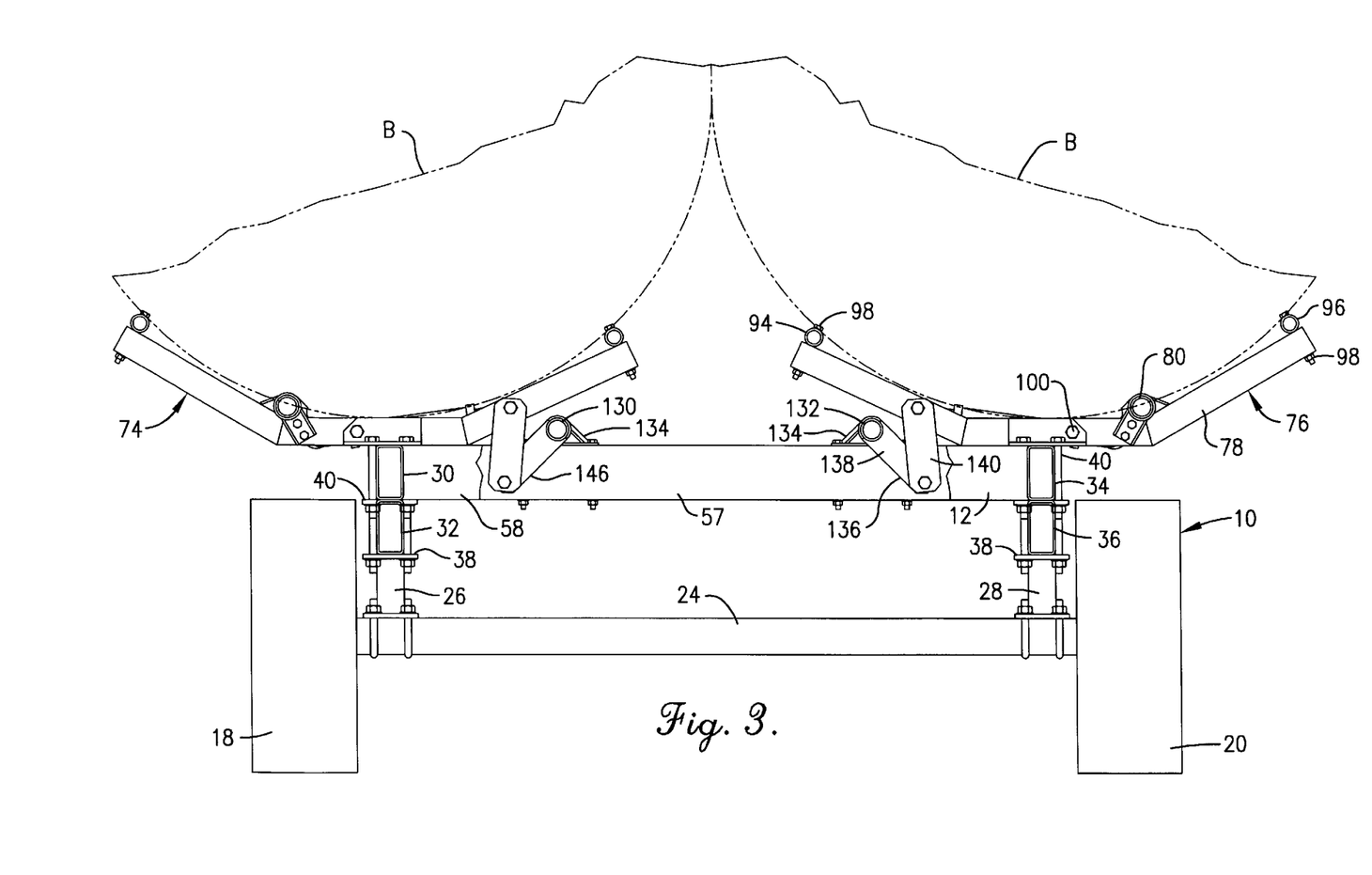
FIG. 3 is an enlarged rear elevational view of the trailer, particularly illustrating a profile of a round bale supported by each of the cradles.
Figure 5:
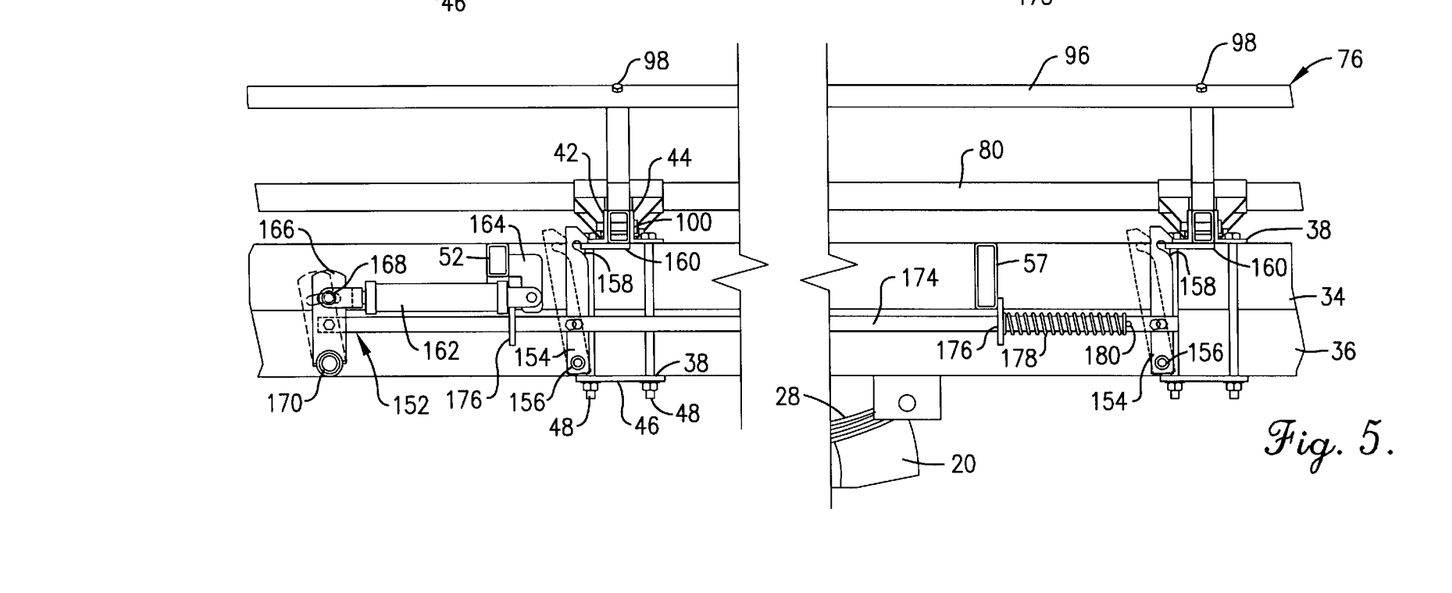
FIG. 5 is an enlarged cross-sectional view of the trailer taken along line 5—5 of FIG. 1, with parts being fragmented and broken away to particularly illustrate various components of the safety latch apparatus.

With the foregoing caveat in mind, the illustrated bale moving trailer 10 includes a generally rectangular shaped frame 12 that is supported for movement by four ground wheels 14,16,18,20. As shown in FIGS. 1 and 3, the front pair of wheels 14,16 are rotatably supported on a common axle 22 and the rear pair of wheels 18,20 are similarly interconnected by an axle 24. Although not shown in detail, it will be appreciated that the axles 22 and 24 are each connected to the frame 12 by a pair of standard leaf spring assemblies 26 and 28 (only the leaf spring assemblies for the rear axle 24 being shown in FIGS. 3 and 5).

Figure 4:
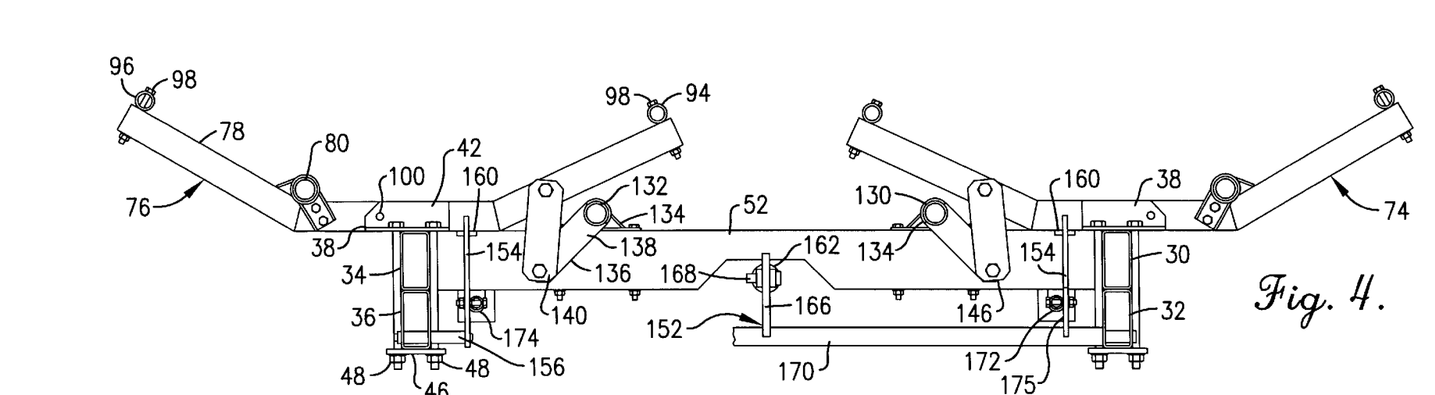
FIG. 4 is an enlarged cross-sectional view of the trailer taken along line 4—4 of FIG. 1, with parts being fragmented and broken away to particularly illustrate various components of the safety latch apparatus.

The preferred frame 12 includes spaced apart left and right side beams, each comprising a respective pair of stacked tubes 30,32 and 34,36 (e.g., see FIG. 4). The beams are equal in length and are positioned parallel to and on opposite sides of the fore-and-aft axis of the trailer 10. Each of the tubes 30,32,34,36 is preferably formed of steel and presents a rectangular cross-sectional shape. Furthermore, the lower tube 30 and 32 of each pair is shorter than the respective upper tube 34 and 36, and the tubes of each beam are arranged so that the rear end of the lower tube is spaced forwardly from the rear end of the upper tube (see FIG. 2). The tubes 30,32 or 34,36 of each beam are secured to one another by suitable means. In the illustrated embodiment, the adjacent tubes 30,32 or 34,36 are attached to another by clamp assemblies 38, there being six such clamp assemblies 38 spaced along the length of each of the beams. It will be appreciated that the clamp assemblies 38 are identical in construction. Thus, only one of the clamp assemblies 38 will be described in detail, with the understanding that the remaining clamp assemblies are similarly constructed. With particular respect to the second clamp assembly from the front of the right side beam (see FIGS. 4 and 5), a pair of laterally extending, L-shaped channels 42 and 44 are provided against the top surface of the upper tube 34. A bottom plate 46 is provided against the undersurface of the lower tube 36, and the tubes 34,36 are clamped between the channels 42,44 and plate 46 by four nut and bolt assemblies 48. For purposes described below, the channels 42 and 44 present spaced apart, upright flanges. It is also noted that each side beam includes a rear pivot assembly 40 (see FIGS. 1–3) that has a construction similar to the clamp assemblies 38. The pivot assemblies 40 and clamp assemblies 38 cooperate to swingably attach the bale support structure to the frame, as will be described below; however, the pivot assemblies 40 are attached only to the upper tubes 34 and 36.

The frame 12 further includes six crossbeams 50,52,54, 56,57,58 spaced apart along the length of the frame 12. Each of the crossbeams preferably comprises a rectangular tube (similar to the tubes 30,32,34,36) that is fixed relatively perpendicularly between the upper tubes 30 and 34. As perhaps best shown in FIG. 1, the rearmost crossbeam 58 is located between the rear ends of the upper tubes 30 and 34, while the forwardmost crossbeam 50 is spaced rearwardly from the front ends of the side beams.

A standard gooseneck hitch 60 is provided at the front of the frame 12 (see FIGS. 1 and 2). As is customary, the hitch 60 includes a pair of arms 62 and 64 diverging rearwardly from a central post 66. The arms 62 and 64 are connected to respective ones of the side beams 30,32 and 34,36 by upright, gusseted stanchions 68 (only one being shown in FIG. 2). An adjustable jack 70 having a hand crank 72 is provided at the hitch 60 for supporting the front end of the frame 12 when the trailer 10 is unhitched from the towing vehicle (not shown).

The trailer 10 is also provided with a pair of long bale support cradles 74 and 76 that project beyond the rear end of the frame 12 and terminate just behind the hitch 60. Generally speaking, the cradles 74 and 76 are positioned along opposite sides of the frame 12, extending parallel to and being equally spaced from the fore-and-aft axis of the trailer 10. It is initially noted that the cradles are identical in construction and therefore only the right side cradle 76 will be described in detail, with the understanding that the left side cradle 74 is similarly constructed.

Figure 6:
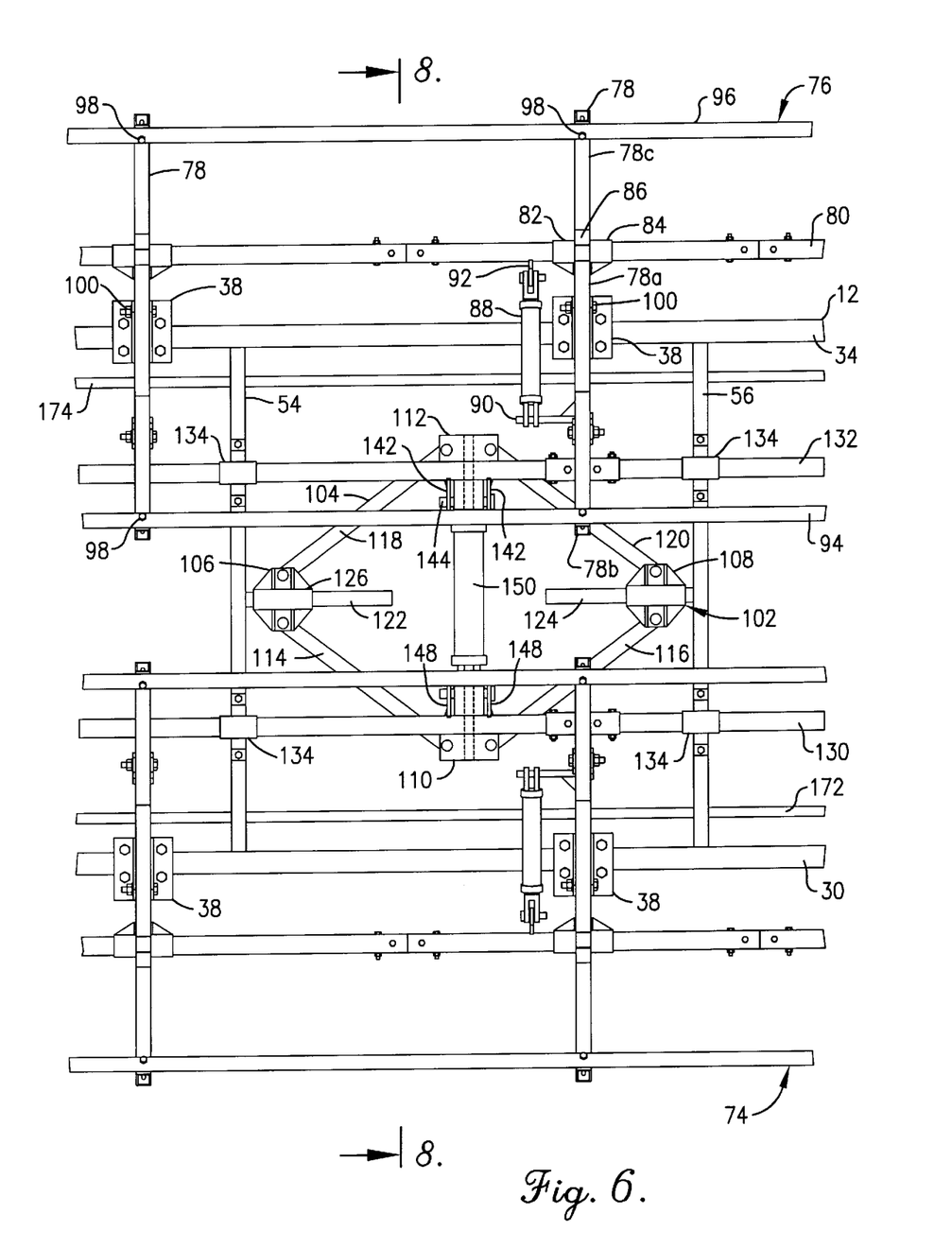
FIG. 6 is an enlarged fragmentary, top plan view of the trailer, with parts being fragmented and broken away to particularly illustrate the condition of the control mechanism when the cradles are in their respective bale-carrying positions.
Figure 7:
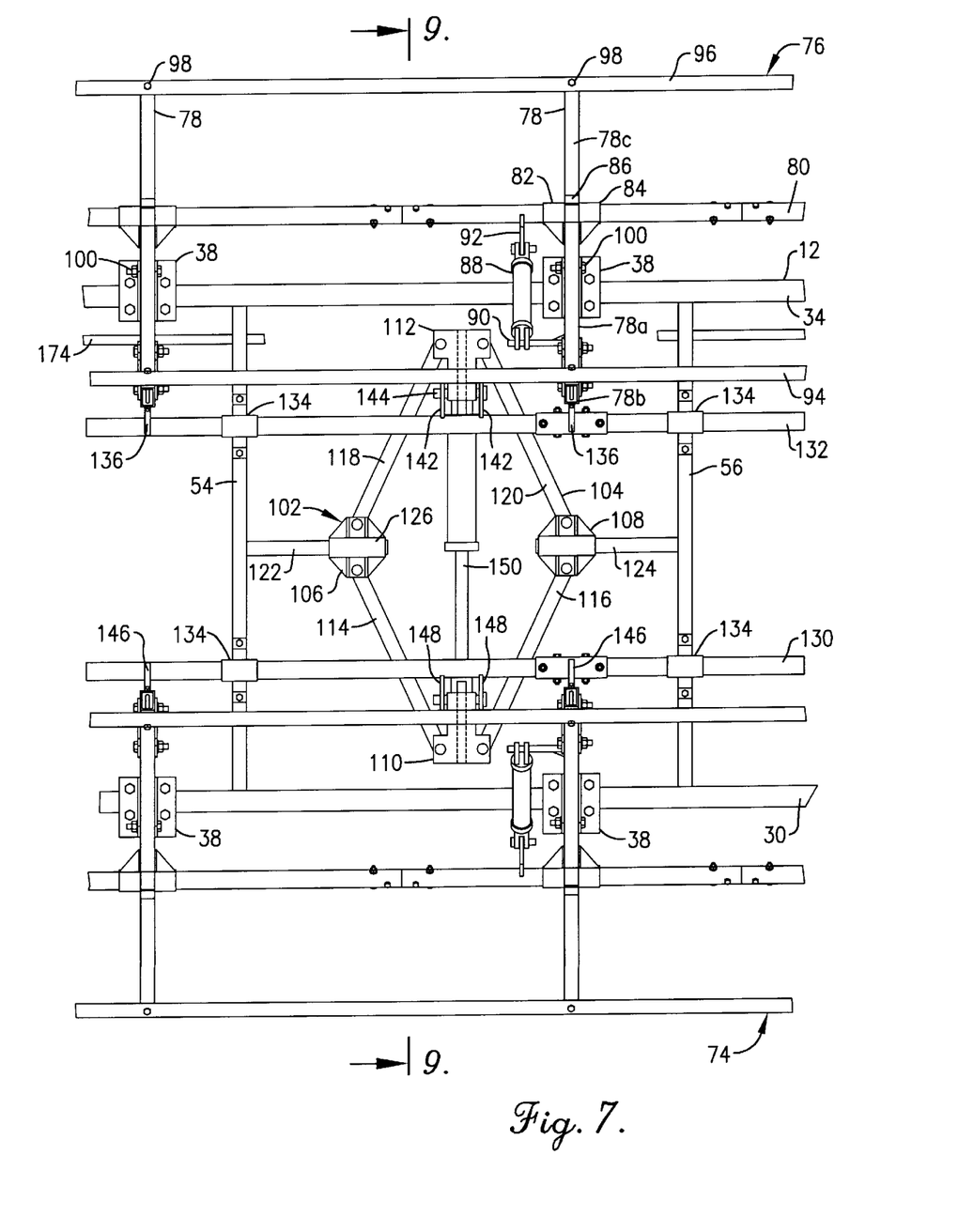
FIG. 7 is an enlarged fragmentary, top plan view of the trailer similar to FIG. 6, but illustrating the condition of the control mechanism when the cradles are in their respective bale-unloading positions.
Figure 8:
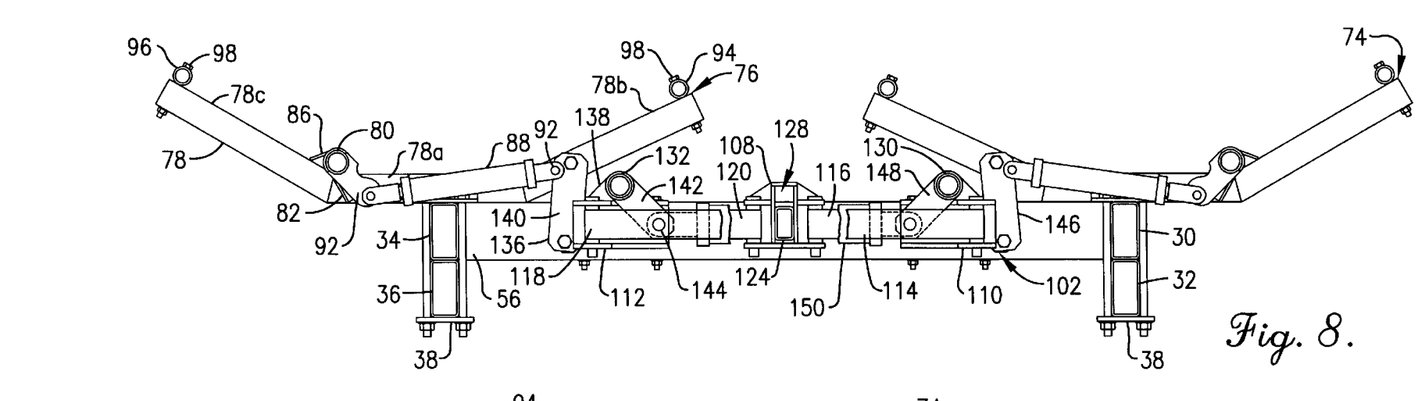
FIG. 8 is a cross-sectional view of the trailer taken along line 8—8 of FIG. 6, with parts being fragmented and broken away to particularly illustrate components of the control mechanism.
Figure 9:
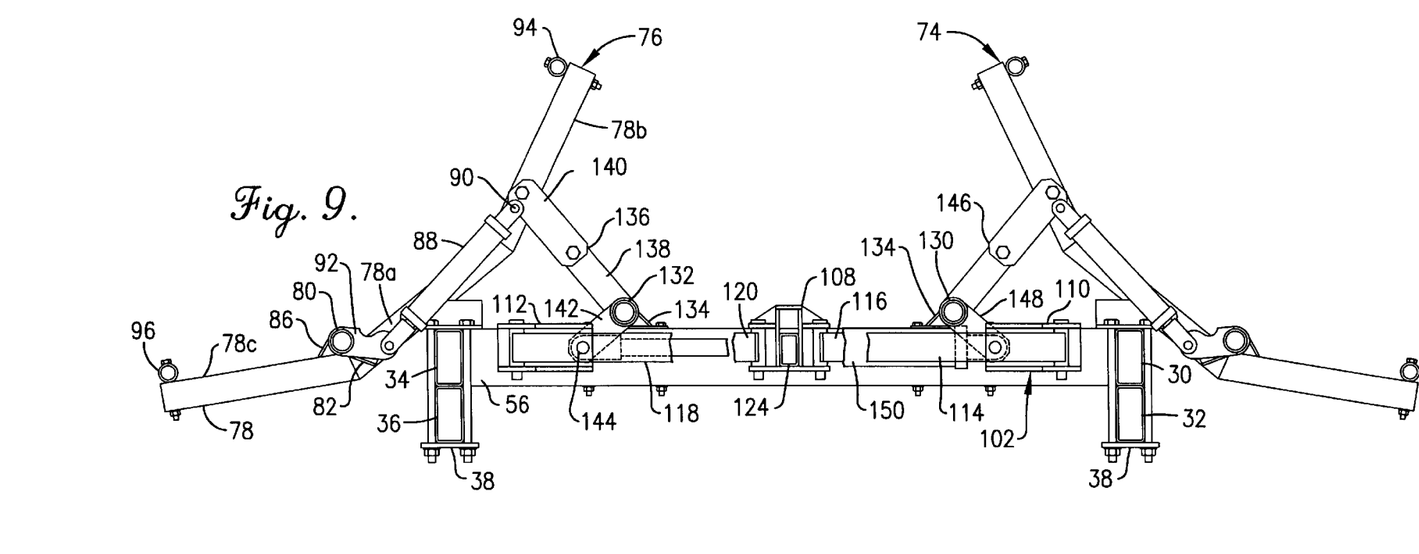
FIG. 9 is a cross-sectional view of the trailer taken along line 9—9 of FIG. 7, with parts being fragmented and broken away to particularly illustrate components of the control mechanism.
Figure 10:
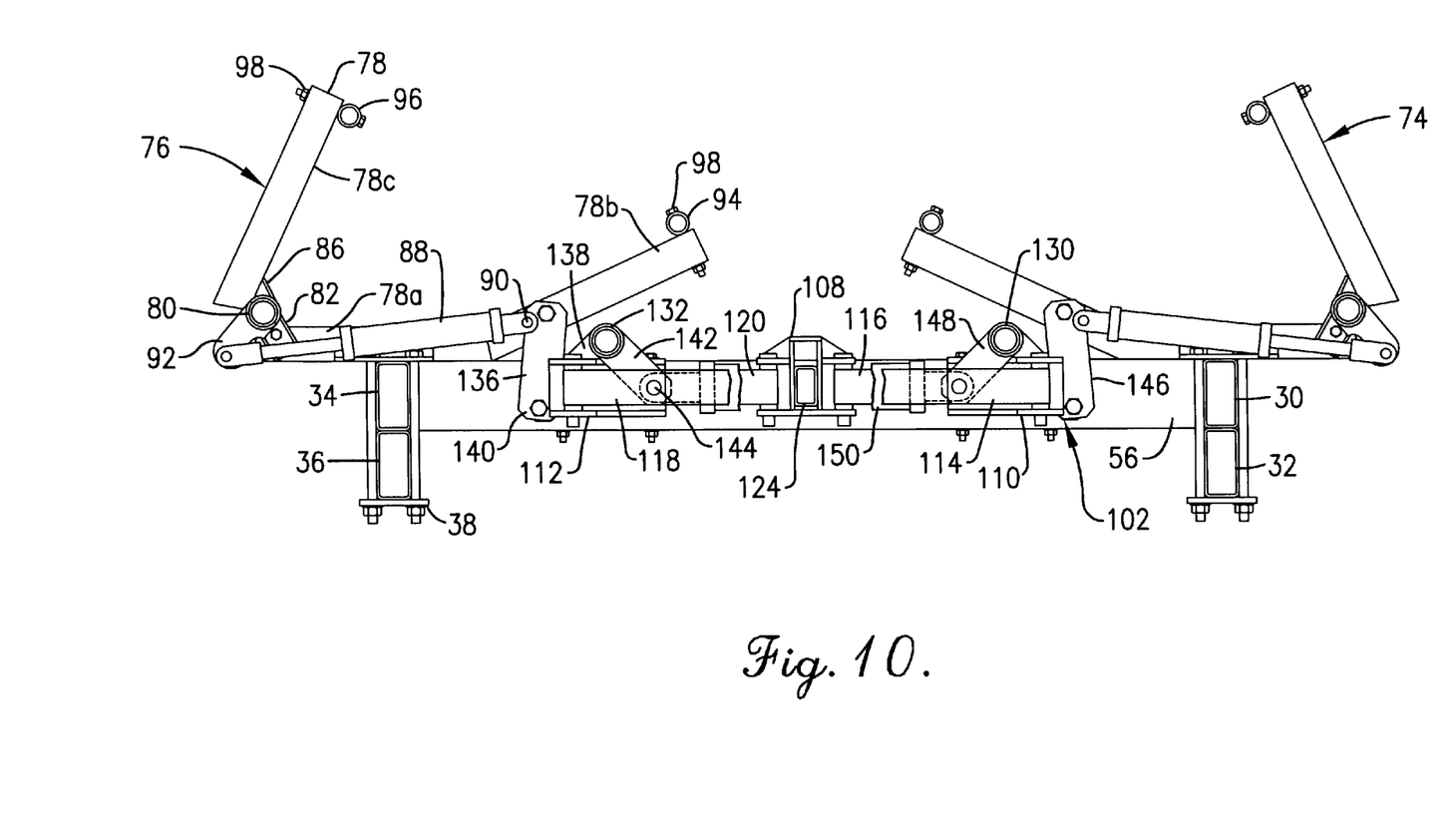
FIG. 10 is a cross-sectional view of the trailer similar to FIG. 8, but illustrating the wing sections of the cradles being swung inwardly to their respective folded conditions.

Turning to FIG. 3, the right side cradle 76 includes a series of bale engagement bars 78 spaced along the length of the frame 12 and configured to engage the bottom periphery of a bale. There are preferably a total of seven bars 78, each of which is aligned along the length of the frame 12 with one of the clamp assemblies 38 or pivot assembly 40 (see FIG. 6). It will be appreciated that the illustrated bars 78 are designed to cup the underside of a large round bale (referenced by the letter "B" in FIG. 3), although the cradles may alternatively be configured to captivatingly engage various although types of bales. In any case, each of the bale engagement bars 78 presents a concave upper margin designed to wrap at least partly around the supported bale. The illustrated engagement bars 78 are identical in construction and each includes a bight section 78a and a pair of outwardly diverging wing sections 78b and 78c (see particularly the engagement bar shown in FIGS. 8–10). Preferably, the sections 78a,78b,78c are formed of steel tubes, with the bight section 78a and inner wing section 78b being fixed to one another by suitable means (e.g., welding). However, the outer wing section 78c is pivotally supported on the bight section 78a so that the former may be swung from the operational position (shown in FIGS. 8 and 9) to a folded or retracted position (shown in FIG. 10). In the illustrated embodiment, the pivotal connection between the bar sections 78a and 78c is provided primarily by a pivot tube 80 that extends the length of the cradle 76 and preferably comprises a plurality of end-to-end, interconnected cylindrical tube sections. A pair of bearing sleeves 82 and 84 (see also FIGS. 6 and 7) are fixed to the front and rear sides of the bight section 78a and rotatably support the pivot tube 80. A crank 86 (see FIGS. 8–10) is fixed between the pivot tube 80 and the outer wing section 78c so that rotation of the former effects swinging of the latter.

A hydraulic piston and cylinder assembly 88 is pivotally connected between the inner wing section 78b and pivot tube 80, such that extension and retraction of the assembly 88 causes rotation of the tube 80 and thereby swinging of the outer wing section 78c. Particularly, the cylinder end of the assembly 88 is pivotally connected to the inner bight section by a forwardly projecting pin 90 (see FIGS. 6 and 7), while the rod end of the assembly 88 is pinned to an arm 92 projecting radially from the pivot tube 80. The outer wing section 78c is in the operational position when the assembly 88 is fully retracted (see FIG. 8) and is in the folded position when the assembly 88 is fully extended (see FIG. 10). Those ordinarily skilled in the art will appreciate that folding of the outer wing section 78c reduces the transport width of the trailer 10.

The bale engagement bars 78 of the right side cradle 76 are interconnected by two cylindrical connection tubes 94 and 96 attached to the distal ends of respective ones of the wing sections 78b and 78c. Such attachment is preferably provided by nut and bolt assemblies 98. Because the wing sections 78b and 78c are of equal length and are similarly angled relative to the bight section 78a, the connection tubes 94 and 96 are spaced equally from the bight section 78a. It is also noted that the connection tubes 94 and 96 are equal in length and parallel to the pivot tube 80.

It will be appreciated that the outer connection tube 96 requires the outer wing sections 78c to swing in unison, and therefore the single hydraulic power assembly 88 serves to swing all of the wing sections 78c. Moreover, each of the bight sections 78a is swingably supported on the frame 12, and the connection tubes 94 and 96 cooperatively ensure that all of the bale engagement bars 78 of the right side cradle 76 swing in unison. It is particularly noted that each bight section 78a is pivotally supported between the upright flanges of the channels 42 and 44 of the adjacent clamp assembly 38 (or pivot assembly 40 with respect to the rearmost bale engagement bars) by a nut and bolt assembly 100. As will subsequently be described, each of the cradles 74 and 76 is swingable between a bale-carrying position (perhaps best shown in FIGS. 3 and 8) and a bale-unloading position (perhaps best shown in FIG. 9). Again, the left side cradle 74 has a construction that is virtually a mirror image of that described above with respect to the right side cradle 76.

The present invention particularly concerns a control mechanism 102 that synchronizes the swinging movement of the cradle 74 and 76. Preferably, the control mechanism 102 not only synchronizes movement of the cradles 74 and 76 in both directions between the bale-carrying and bale-unloading positions, but also serves to swing the cradles 74 and 76 between those positions. That is to say, the preferred control mechanism 102 provides the power for swinging the cradles 74 and 76 and ensures that the cradles 74 and 76 swing in unison. It is particularly noted that synchronized swinging of the cradles 74 and 76 is particularly important when the cradles 74 and 76 are swung to unload the bales from the trailer 10. Those ordinarily skilled in the art will appreciate that, if one of the side cradles unloaded the bales before the other, the weight on the one unloaded side of the trailer 10 might cause damage to the trailer 10 and/or the towing vehicle (not shown) and, in extreme cases, might cause the trailer 10 and/or the towing vehicle to tip over.

In the illustrated embodiment, the control mechanism 102 includes a diamond-shaped linkage assembly 104 that is located between the third and fourth crossbeams 54 and 56. Moreover, the linkage assembly 104 serves to correspond swinging movement of each bale support cradle with the other. The linkage assembly 104 includes a pair of carriages 106,108 defining opposite corners of the assembly 104 and a pair of connectors 110,112 defining the other opposite corners of the assembly 104. The linkage assembly 104 further includes four equal-length bars 114,116,118,120, each of which is pivotally connected between one of the carriages 106,108 and one of the connectors 110,112. The linkage assembly 104 defines an equal-sided diamond and adjustment of the assembly 104 consequently causes simultaneous and equivalent shifting of the carriages 106,108 in opposite directions along a first axis, as well as simultaneous and equivalent shifting of the connectors 110,112 in opposite directions along a second axis that is perpendicular to the first axis (e.g., compare FIGS. 6 and 7).

In the illustrated embodiment, the carriages 106 and 108 are slidably supported on respective rails 122 and 124 positioned along the fore-and-aft axis of the trailer 10. The rails 122 and 124 are fixed (e.g., by welding) to the opposing faces of the crossbeams 54 and 56, such that the rails project toward one another. As perhaps best shown in FIG. 11, the front carriage 106 includes a rectangular shaped plate assembly 126 presenting an opening 128 that is taller than the rail 122 but has a lateral dimension which causes the rail 122 to be snugly received within the assembly 126. In this respect, the carriage 106 is permitted to shift vertically relative to the rail 122 but is limited to sliding movement along the fore-and-aft axis of the trailer 10. Although not shown in detail, it will be appreciated that the rear carriage 108 is similarly arranged. Moreover, because the carriages 106,108 are limited to sliding movement along the fore-and-aft axis of the trailer 10, the connectors 110,112 are always equally spaced from the fore-and-aft axis.

The control mechanism 102 further includes a pair of rock shafts 130,132 that extend parallel to and are spaced equally from the fore-and-aft of the axis of the trailer 10. The rock shafts 130,132 extend from the front crossbeam 50 to the rear crossbeam 58 (see FIG. 1) and are rotatably supported on each of the crossbeams 50,52,54,56,57,58. As perhaps best shown in FIG. 11, a bearing sleeve assembly 134 fastened to the top of each crossbeam (crossbeam 54 in FIG. 11) rotatably receives the corresponding rock shaft 130 or 132.

A series of linkage assemblies 136 (see FIGS. 4 and 11) interconnect the right rock shaft 132 and each of the bale engagement bars 78 so that rotation of the shaft 132 causes swinging of the cradle 76. Each illustrated linkage assembly 136 comprises a crank 138 projecting radially from the shaft 132 and a bar 140 in the form of two plates pivotally connected between the crank 138 and the inner wing section 78b (see FIG. 11). In the illustrated embodiment, the linkage assemblies 136 cause the right side cradle 76 to swing in a direction opposite to the rotational direction of the rock shaft 132. For example, clockwise rotation of the rock shaft 132 (when viewing FIGS. 8 and 9) corresponds with swinging of the right side cradle 76 in a counterclockwise direction. Furthermore, the linkage assemblies 136 serve to limit swinging of the right side cradle 76 in the counterclockwise direction (when viewing FIGS. 8 and 9). As particularly shown in FIG. 9, further swinging of the right side cradle 76 in the counterclockwise direction is prevented once the linkage assembly 136 has fully extended. It is also noted that swinging of the right side cradle 76 in the clockwise direction is limited by abutting interengagement between the undersurface of the bight section 78a and the top surface of the upper tube 34.

Figure 11:
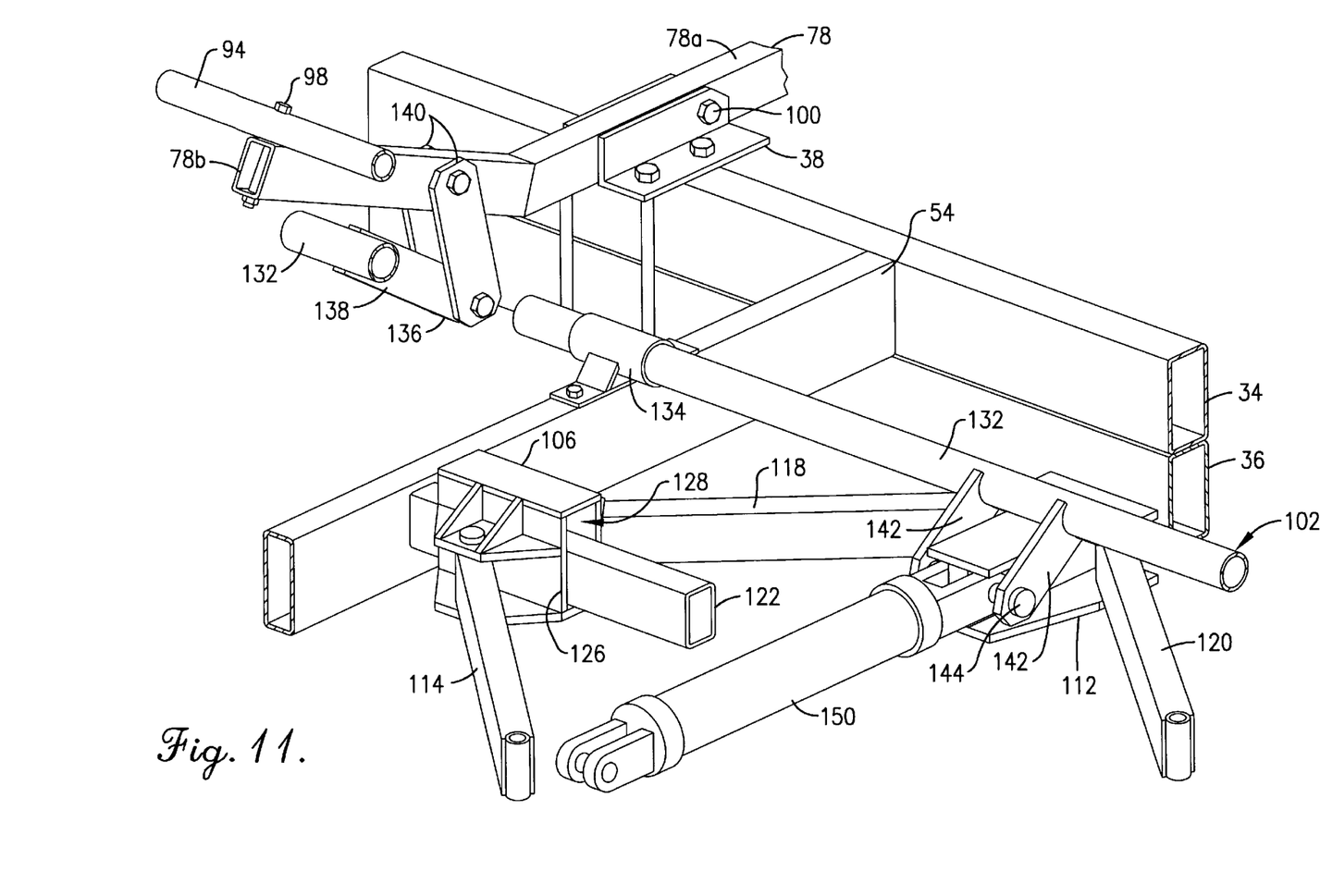
FIG. 11 is an enlarged fragmentary, perspective view of a portion of the control mechanism, particularly illustrating a portion of the hydraulic piston and cylinder assembly and diamond-shaped linkage assembly.

Further, a pair of arms 142 connects the right rock shaft 132 to the right connector 112 (see FIG. 11). The arms 142 are fixed to the rock shaft 132 to project along a common radius from locations spaced along the length of the shaft 132. The connector 112 is positioned between the arms 142 and is pivotally attached to the arms 142 by a pin 144. In this respect, rotation of the rock shaft 132 corresponds not only with swinging of the cradle 76 but also shifting of the connector 112.

Although not described in detail, it will be appreciated that the left side cradle 74 is similarly connected to the left rock shaft 130 by a series of linkage assemblies 146. Furthermore, a pair of arms 148, similar to the arms 142 described above, are attached between the left rock shaft 130 and left connector 110 so that rotation of the shaft 130 corresponds with shifting of the connector 110.

As noted above, the linkage assembly 104 limits the connectors 10 and 112 to equivalent and simultaneous shifting in opposite directions. This necessarily requires the rock shafts 130 and 132 to simultaneously and equivalently rotate in opposite directions, which in turn limits the bale support cradles 74 and 76 to simultaneous and equivalent swinging movement in opposite directions. In other words, swinging movement of the bale support cradles 74 and 76 is synchronized. Thus, swinging movement of each bale support cradle from the bale-carrying position to the bale-unloading position is initiated at the same time and continues at the same rate as the other cradle. The same may be said as the cradles 74 and 76 swing from their respective bale-unloading to bale-carrying positions.

The illustrated control mechanism 102 also includes a single power device 150 in the form of a hydraulic piston and cylinder assembly, although other suitable power devices may be used. The piston and cylinder assembly 150 is pivotally attached to the connectors 110 and 112 so that extension and retraction of the former effects shifting of the latter. As shown in FIG. 11, the assembly 150 and connector 112 are pivotally interconnected by the same pin 144 that attaches the connector 112 to the arms 142. It will be appreciated that a similar connection is provided on the cylinder end of the assembly 150. Accordingly, when the assembly 150 extends, the connectors 110 and 11 are shifted away from one another (such shifting being simultaneous and equivalent as a result of the linkage assembly 104) which thereby causes the cradles 74 and 76 to synchronously swing toward their respective bale-unloading positions. Conversely, retraction of the assembly 150 will cause the cradles 74 and 76 to swing in unison toward their respective bale-carrying positions. It is noted that the connectors 110, 112 are supported by the swingable arms 142,148 and therefore move vertically along an arcuate path as the connectors 110,112 are shifted along their common axis. Because the carriages 106,108, the bars 114,116,118,120 and the assembly 150 are supported by the connectors 110,112, they must also move vertically as the cradles 74 and 76 are swung. It is particularly noted that the extra tall opening 128 provided for each of the carriages 106 and 108 permits such vertical shifting of the carriages 106 and 108 relative to the rails 122 and 124 (compare the position of the rear carriage 108 to the rail 124 in FIG. 8 versus FIG. 9).

The illustrated trailer 10 is also provided with a safety latch mechanism 152 that serves to releasably lock the cradles 74 and 76 in their bale-carrying positions. As perhaps best shown in FIGS. 4 and 5, the mechanism 152 includes four latch bars 154 (only three of the bars being shown in the drawing figures), two of which are mounted adjacent the left side beam 30,32 and the other two being mounted adjacent the right side beam 34,36. As particularly shown in FIG. 4 with respect to the right front latch bar, a shaft assembly 156 serves to pivotally support the latch bar 154 on the lower tube 36. Each of the bars 154 is provided with a rearwardly facing notch 158 designed to receive the forward end of a plate 160 projecting from the underside of the adjacent bale engagement bar 78. Such latching interengagement is provided only when the latch bar is in the vertical orientation (shown in solid lines in FIG. 5) and the corresponding cradle is in the bale-carrying position. Furthermore, such latching interengagement prevents swinging of the cradles 74 and 76 from their respective bale-carrying positions. The latch bars 154 are each swingable to an unlatched position (shown in phantom lines in FIG. 5), in which the bar 154 is disengaged from the plate 160 and thereby permits swinging of the corresponding cradle.

Preferably, operation of the latch bars 154 is controlled by a single hydraulic piston and cylinder unit 162 so that the bars 154 are simultaneously swung into and out of latching engagement with the plates 160. The cylinder end of the unit 162 is pivotally supported by a lug 164 depending from the crossbeam 52. On the other hand, the rod end of the unit 162 is connected to a crank 166 by a pin-slot connection 168 that permits limited lost motion between the unit 162 and crank 166. The crank 166 is fixed to a pivoting cross bar 170 rotatably supported between the lower tubes 32 and 36. A pair of connecting rods 172 and 174 are similarly attached to the cross bar 170 by respective cranks 175 (only one being shown in FIG. 4). The connecting rods 172,174 are suspended from the crossbeams by U-shaped supports 176 (see FIG. 5) and are fastened to respective ones of the latch bars 154. In this respect, forward movement of the connecting rods 172 and 174 causes swinging of the bars 154 to their unlatched position, and rearward movement of the rods 172,174 conversely permits swinging of the bars 152,154 into latching engagement with the plates 160. A coil spring 178 is retained on each of the connecting rods 172,174 between the rearmost support 176 and a pin 180 for yieldably biasing the latch bars 154 into latching engagement with the plates 160.

In view of the foregoing, the piston and cylinder unit 162 is extended to shift the latch bars 154 to the unlatched position, with such extension of the unit 162 being sufficient to accommodate for the pin-and-slot connection 168. When it is desired to latch the cradles 74 and 76 in their respective bale-carrying positions, the piston and cylinder unit 162 is fully retracted and the springs 178 return the latch bars 154 to their vertical orientation. If the cradles 74 and 76 have not swung completely to their respective bale-carrying positions before the bars 154 are returned to their vertical orientation, each plate 160 will engage the angled rear surface 154a of the corresponding bar 154 to shift the bar 154 against the spring bias until the plate 160 has moved downwardly into vertical alignment with the notch 158, whereupon the bar 154 is biased back into the vertical orientation. Of course, this causes corresponding movement of the connecting rods 172,174, as well as movement of the cross bar 170 and crank 166. The pin-and-slot connection 168 permits such movement without reducing adjustment of the unit 162.

Preferably, the piston and cylinder assemblies 88 for folding the outer wing sections 78c of the cradles 74,76 are provided in a single circuit and connected in a parallel fluid flow relationship, whereby the assemblies 88 are controlled independently of the various other hydraulic power devices of the trailer 10. However, the piston and cylinder assembly 150 of the control mechanism 102 and the piston and cylinder unit 162 of the latch mechanism 152 are preferably provided in the same circuit so that operation of the control and latch mechanisms 102,152 may be controlled by a single valve (not shown). It is particularly noted that the assembly 150 and unit 162 are connected in a parallel fluid flow relationship and are arranged so that operation of the assembly 150 and unit 162 is sequenced. Those ordinarily skilled in the art will appreciate that there will normally be greater resistance to extension of the piston and cylinder assembly 150 (as a result of the bales being supported on the cradles 74 and 76), than resistance to extension of the piston and cylinder unit 162 (such resistance being attributable primarily to the bias of springs 178). Thus, each of the latch bars 154 will be moved to the unlatched position before the cradles 74 and 76 are forced to swing from their respective bale-carrying to bale-unloading positions. A similar relationship is provided with respect to retraction of the assembly 150 and unit 162, wherein each of the latch bars 154 will normally be shifted to their vertical orientation before the cradles 74 and 76 return to their respective bale-carrying positions.

The operation of the trailer 10 should be apparent from the foregoing description, and it shall therefore be sufficient to explain that the cradles 74 and 76 are first placed in their respective bale-carrying positions. Loading of the bales on the cradles 74 and 76 preferably occurs in an alternating fashion, wherein a bale is loaded on one of the cradles followed by loading of a bale on the other cradle before another bale is loaded on the first cradle. The bales are preferably loaded in pairs, with each pair of bales being aligned on the fore-and-aft axis of the trailer 10 and including one bale supported on each of the cradles. The illustrated trailer 10 is configured to support fourteen so-called "large round bales", although it is not necessary to fully load the trailer 10 during operation. Moreover, the principles of the present invention are equally applicable to other mover sizes designed with various other bale support capacities. For example, it is entirely within the ambit of the present invention to design each cradle so that it supports only one bale thereon. It is also noted that various other types of bales (e.g., large rectangular bales) may be supported on the cradles. When it is desired to unload the bales, pressurized hydraulic fluid is simultaneously supplied to the piston and cylinder assembly 150 and piston and cylinder unit 162. As noted above, this first causes each of the latch bars 154 to be shifted out of engagement with the respective cradles 74 and 76, and then the cradles 74 and 76 are swung in unison to their respective bale-unloading positions. It is noted that each of the cradles 74 and 76 is sufficiently inclined when in the bale-unloading position to permit the bales to fall by gravity therefrom.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A bale mover comprising:
   a frame;
   a pair of bale supporting cradles, each having a bale support capacity that is generally equal to the other so that the cradles are configured to support an equal number of similarly dimensioned bales,
   each of said cradles being supported on the frame for shifting movement between a bale-carrying position, in which the cradle is oriented to support the number of bales, and a bale-unloading position, in which the cradle is oriented to unload the number of bales; and
   a control mechanism operably coupled to the cradles and configured to restrict the cradles to substantially synchronized shifting movement as each cradle shifts from the bale-carrying position to the bale-unloading position.

2. A bale mover as claimed in claim 1; and
   a plurality of ground engaging wheels on which the frame is supported for movement across the ground.

3. A bale mover as claimed in claim 2,
   said frame including a hitch connectable to a towing vehicle.

4. A bale mover as claimed in claim 2,
   said frame presenting a fore-and-aft axis relative to a direction of travel,
   said cradles extending along the length of the axis and being on opposite sides of the axis.

5. A bale mover as claimed in claim 4,
   each of said cradles including a longitudinally extending, laterally outermost wing section that is swingable into and out of an outwardly projecting use position.

6. A bale mover as claimed in claim 1,
   said control mechanism being configured to substantially synchronize shifting of the cradles as each of the cradles shifts from the bale-unloading position to the bale-carrying position.

7. A bale mover as claimed in claim 6,
   said control mechanism including an extendable and retractable element operably coupled between the cradles in such a manner that extension and retraction of the element corresponds with generally equal and simultaneous shifting of the cradles.

8. A bale mover as claimed in claim 7,
   said element comprising a pair of components that are shiftable relative to one another along a first axis as the element extends and retracts,
   said control mechanism including a pair of spaced apart carriages shiftably supported along a common second axis that is at least substantially perpendicular to the first axis,
   said control mechanism further including four equal length bars, each being pivotally connected between one of the components and one of the carriages so that the bars cooperatively present an equal-sided diamond shape, whereby the components shift equally in relatively opposite directions when the element extends and retracts.

9. A bale mover as claimed in claim 8,
   said control mechanism including a pair of rock shafts, each being operably coupled to a respective one of the cradles so that rotation of the rock shaft corresponds with shifting of the respective one of the cradles,
   said components being connected to respective ones of the rock shafts so that shifting of each component corresponds with rotation of the respective rock shaft.

10. A baler mover as claimed in claim 9,
    said frame presenting a fore-and-aft axis relative to a direction of travel,
    said second axis being aligned with the fore-and-aft axis,
    said cradles extending along the length of the aligned axes and being swingable about respective pivots spaced equally from the aligned axes,
    said rock shafts presenting respective rotational axes that are spaced equally from the aligned axes.

11. A bale mover as claimed in claim 9,
    said element comprising a double acting fluid piston and cylinder assembly that shifts the cradles when the assembly is extended and retracted.

12. A bale mover as claimed in claim 1,
    said control mechanism being configured to shift each of the cradles between the bale-carrying and bale-unloading positions.

13. A bale mover as claimed in claim 12,
    said control mechanism including a single fluid piston and cylinder assembly operably coupled between the cradles in such a manner that extension and retraction of the assembly causes at least substantially equal and simultaneous shifting of the cradles.

14. A bale mover as claimed in claim 1; and a safety latch apparatus operable to releasably latch each of the cradles in the bale-carrying position.

15. A bale mover as claimed in claim 14, said safety latch apparatus including a plurality of moveable latches, each being yieldably biased into latching engagement with a respective one of the cradles.

16. A bale mover as claimed in claim 15, said control mechanism including a fluid piston and cylinder assembly operably coupled between the cradles in such a manner that extension and retraction of the assembly causes at least substantially equal and simultaneous shifting of the cradles, said safety latch apparatus including a fluid piston and cylinder unit operably coupled to the latches for moving each latch out of latching engagement with the respective cradle, said assembly and unit being connected in a parallel fluid flow relationship, said control mechanism and said latch apparatus being arranged so that the unit will cause movement of each latch out of latching engagement with the respective cradle before the assembly shifts the cradles from their respective bale-carrying positions.

17. A bale mover as claimed in claim 1, said control mechanism including an equal-sided, diamond-shaped linkage assembly comprising a first pair of spaced apart, relatively shiftable corner elements and a second pair of spaced apart, relatively shiftable corner elements, said control mechanism further including four bars, each being pivotally connected between one of the corner elements of the first pair and one of the corner elements of the second pair, whereby adjustment of the linkage assembly causes the corner elements of the first pair to shift equally along a first axis and the corner elements of the second pair to shift equally along a second axis that is at least substantially perpendicular to the first axis, said corner elements of the first pair being operably coupled to respective ones of the cradles so that shifting of the cradles corresponds with shifting of the respective corner elements.

18. A bale mover as claimed in claim 17, said control mechanism including a fluid piston and cylinder assembly extending between the first pair of corner elements.

19. A bale mover as claimed in claim 17, said control mechanism including a pair of rotatable rock shafts, each being connected between one of the cradles and the respective corner element of the first pair.

20. A bale mover as claimed in claim 19, said frame presenting a fore-and-aft axis relative to a direction of travel, said second axis being aligned with the fore-and-aft axis, said cradles extending along the length of the aligned axes and being swingable about respective pivots that are spaced equally from the aligned axes, said rock shafts presenting respective rotational axes that are spaced equally from the aligned axes.

* * * * *